United States Patent [19]

Rabe

[11] Patent Number: 4,819,525

[45] Date of Patent: Apr. 11, 1989

[54] ROTARY CUTTING TOOL DEVICE AND METHOD FOR USE

[75] Inventor: George B. Rabe, Sparta, N.J.

[73] Assignee: Foster Wheeler Energy Corporation, Clinton, N.J.

[21] Appl. No.: 32,960

[22] Filed: Mar. 30, 1987

Related U.S. Application Data

[63] Continuation of Ser. No. 832,545, Feb. 24, 1986, abandoned.

[51] Int. Cl.[4] .............................................. B23D 13/02
[52] U.S. Cl. ....................................... 82/1.11; 82/113; 408/1 R; 408/159
[58] Field of Search .................. 82/1 C, 4 C, 1.2, 1.4, 82/1.5; 144/205; 409/143; 408/1 R, 79, 80, 154, 155, 156, 157, 159, 160, 161, 172, 187, 188, 180

[56] References Cited

U.S. PATENT DOCUMENTS

| | | | |
|---|---|---|---|
| 3,051,059 | 8/1962 | Davey | 8/4 C |
| 3,172,310 | 3/1965 | Morrison | 408/111 |
| 3,361,013 | 1/1968 | Vindez | 408/154 |
| 3,875,832 | 4/1975 | Mayfield | 144/205 |
| 3,999,452 | 12/1976 | Larsen | 408/80 |
| 4,114,484 | 9/1978 | Feamster, III | 144/205 |
| 4,257,289 | 3/1981 | Groothins | 82/4 C |
| 4,483,647 | 11/1984 | Gordion et al. | 408/82 |

Primary Examiner—Z. R. Bilinsky
Attorney, Agent, or Firm—Marvin A. Naigur; Martin Smolowitz

[57] ABSTRACT

A rotary cutting tool useful for remotely machining tube ends, and method for using the tool to remotely machine a tube end portion such as for weld preparation. The cutting tool comprises an elongated main body having a reduced diameter front end portion and provided with three equally-spaced longitudinal grooves, each groove containing a spring-actuated cutting blade pivotally attached to the tool body. The cutting blades are adjustable radially relative to the tool body by spring and axially movable collar means, which collar is connected to and operated by an actuating piston means located at the opposite end of the tool. In use, the tool forward end with cutting blades retracted is first remotely inserted through an opening, after which the tool forward end with blades extended is inserted into a tube. The cutting tool is then rotated for trimming the end of the tube to a desired angle, and cleaning the tube end outer surface such as in preparation for welding a new mating replacement tube in place. Following the machining, the blades are retracted and the tool is withdrawn from the tube.

16 Claims, 2 Drawing Sheets

ROTARY CUTTING TOOL DEVICE AND METHOD FOR USE

This application is a continuation, of application Ser. No. 832,545, filed Feb. 24, 1986, now abandoned.

BACKGROUND OF INVENTION

This invention pertains to a rotary cutting tool useful for remotely machining tube ends. It pertains particularly to such a rotary cutting tool device and method for remotely machining an exposed end portion of a tube, such as in preparation for welding on a replacement tube.

In remotely located tubes such as in steam generators for nuclear power plants, bundles of U-shaped heat exchanger tubes are usually provided which are welded into a relatively thick tube sheet of the heat exchanger. During operation of such steam generators over an extended period of time, such as 10 years or more, a corrosive sludge material forms and accumulates on the inner upper surface of the tube sheet. This accumulated sludge material causes corrosion of the heat exchanger tubes to an extent of potential or actual tube failure. To correct this serious problem without undesirable replacement of the heat exchanger, it is necessary to remove the old deteriorated tube end portions from the tube sheet and replace them with new tube portions which are remotely positioned and pressure-tightly welded into place, without removing and dismantling the entire heat exchanger assembly. However, because of the remote and relatively inaccessible location of the tubes and the radioactive environment which is usually involved, such tube replacement is very difficult to accomplish reliably and safely. Thus, a suitable solution to this problem has been needed, particularly for heat exchangers used in the nuclear power industry.

Many rotatable cutting tools are known in the prior art. For example, U.S. Pat. No. 3,051,059 to Davey discloses a tube end milling machine and U.S. Pat. No. 3,172,310 discloses a rotatable deburring tool, but they are not adapted to be remotely inserted through a tube. Also, U.S. Pat. No. 3,999,452 to Larson discloses a rotary device for chamfering the ends of a tube using dual cutting tools guided by the tube, but only the tool blades are inserted into the tube. Thus, the known prior art has not provided a rotatable cutting tool suitable for remote use for machining tube ends, such as in preparation for welding. However, the present invention advantageously provides a rotary cutting tool for remote operation which uses a central guiding member and multiple pivotable blades arranged to be extended radially outwardly, so that they contact both end and outer surfaces of a tube end for remotely machining the surfaces to a precise shape needed for subsequent welding to a mating replacement tube.

SUMMARY OF INVENTION

The present invention provides a rotary cutting tool device useful for remotely machining and trimming exposed end of tubes, such as remotely located heat exchanger tubes. The invention also provides a method for using the cutting tool for remotely machining the exposed end of tubes, such as in preparation for welding to a mating replacement tube.

The rotary cutting tool device according to the present invention comprises an elongated main body having a central portion, a reduced diameter front end portion, and a reduced diameter and threaded rear end portion, the main body having at least one longitudinal groove formed therein. A cutting blade is provided in each longitudinal groove and pivotably attached at its rear end to the tool main body. Preferably, three longitudinal grooves are provided circumferentially equally-spaced apart in the tool body, with a cutting blade being pivotably attached in each longitudinal groove. The cutting blades are each outwardly pivoted near their rear ends and pivotally attached to the tool central body portion, and each blade has cutting surfaces provided at its forward end on at least its inner surface suitably shaped for remotely machining both the end and outside surfaces of a tube into which the tool is inserted. A first spring means is provided in each groove between each cutting blade and the tool body to bias the blade outwardly. Also, the tool body central portion has a cutting edge or surface provided by one side of each longitudinal groove at the shoulder between the body central and front end portions.

A cylindrical collar is provided around the body reduced diameter rear portion in sliding contact with the rear end of each pivotable cutting blade. An annular-shaped second spring means is provided between the cylindrical collar and a thrust washer, and an elongated shaft is attached onto the threaded rear end portion of the tool body. An actuating means is provided attached to the main body rear end by an elongated sleeve around the elongated shaft for axially sliding forward the cylindrical collar for pressing against and retracting the pivotable cutter blades. A suitable rotary means is used for rotating the cutting tool device within the tube being machined. The collar axial actuating means is preferably a fluid operated piston assembly attached to the rear end of the elongated shaft, the piston being arranged to force an actuator sleeve and the cylindrical collar foward and to pivot the cutting blades inwardly against the force of the first spring means. The actuator piston is retracted by a third spring means provided in axial engagement with the piston assembly.

This invention also provides a method for using the rotary cutting tool device for remotely machining the end portion of a tube, such as for welding preparation for welding to a mating replacement tube. In the method, the tool having its pivotable cutting blades each retracted into their longitudinal grooves is remotely and partially inserted into the end of a tube to be machined, each cutting blade being held in a retracted position within its groove in the tool body by fluid pressure provided on the actuator piston. The tool body portion is inserted through a hole or opening in a tube sheet opening, and when the tool is clear of the tube sheet and any other obstructions such as a sludge pile, the fluid pressure on the actuator piston is released and the cutting blades are automatically deployed to an intermediate position by action of the first spring means, which are usually small helical coil springs. The tool is now pushed forward into engagement with the existing tube end. The tapered front end portion of the tool body guides the tool into the tube end, and as the tool body portion enters the tube the cutting blades ride up and onto the tube outer diameter or surface, thereby compressing a spring washer second spring means of the tool as they do so. The tool is pushed forward until tube end cutters formed in the tool body grooves butt up against the tube end. A fourth spring (not shown) maintains tool body pressure against the tube end. Then, by rotating the cutting tool body with blades deployed, the cutting surfaces of the pivotable blades and tool body groove cutting edges scrape the tube outer surfaces and also trim the tube end to the desired shape, such as 40-50% angle bevel suitable for a mating replacement tube to be reliably welded onto the existing tube end.

Following such remote machining of the tube end, the cutting tool is withdrawn from the tube, the piston is actuated by applying fluid pressure and thereby retracting the cutting blades into the body grooves, after which the entire tool assembly is removed through the hole in the tube sheet.

It is an advantage of the present invention that the rotary cutting tool has a forward guiding portion which can be remotely inserted into a tube and is provided with multiple pivotable cutting blades which are remotely adjustable radially outwardly so that they can contact the end and outer surfaces of an existing tube end. Then, by rotating the cutting tool body it remotely trims in a single operation the existing tube end surfaces to a desired shape, such as needed for subsequent welding to a mating replacement tube. Such remote machining operations are made feasible by this invention.

BRIEF DESCRIPTION OF DRAWINGS

The invention will be further described with reference to the following drawings, in which.

DESCRIPTION OF INVENTION

Figure 1:
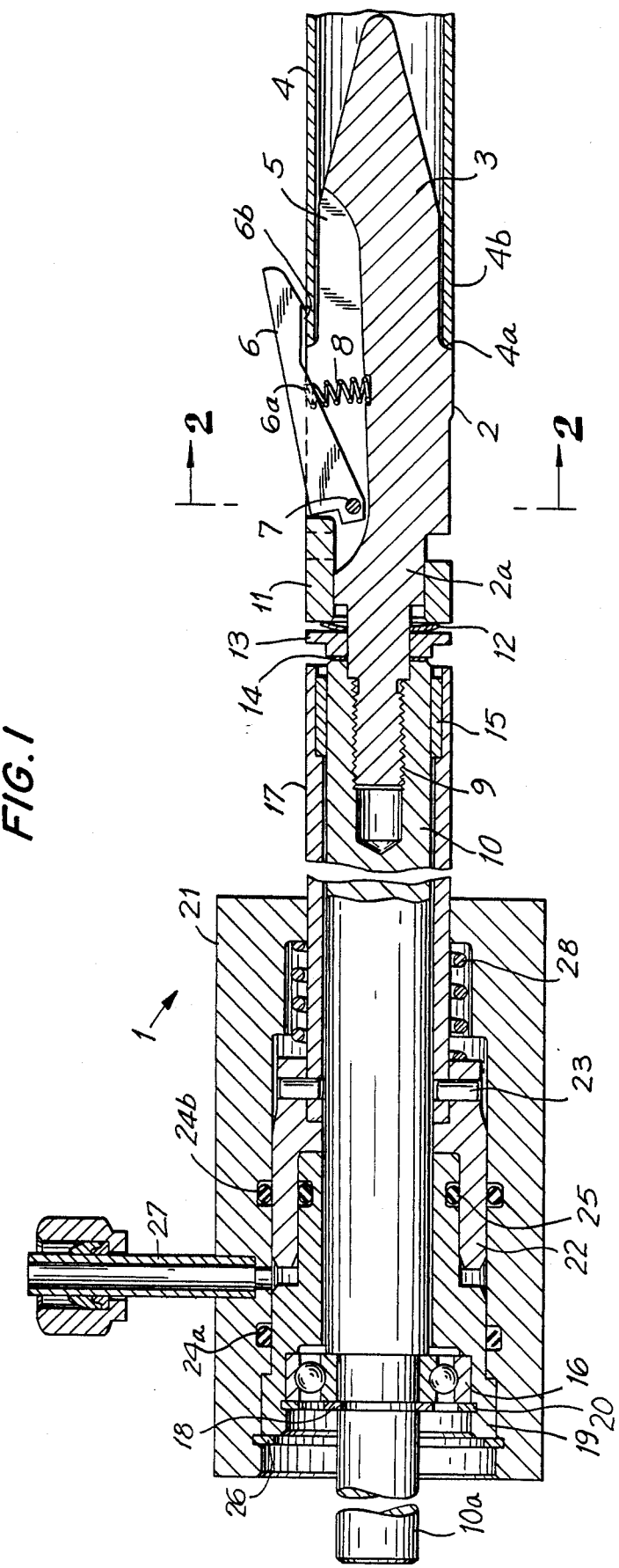
FIG. 1 shows a longitudinal cross-sectional view of the rotary cutting tool with its front end inserted into a tube, with the pivotable cutting blades fully extended to contact the outer surface of the tube, and the groove edges of the tool body contacting the tube end.
Figure 2:
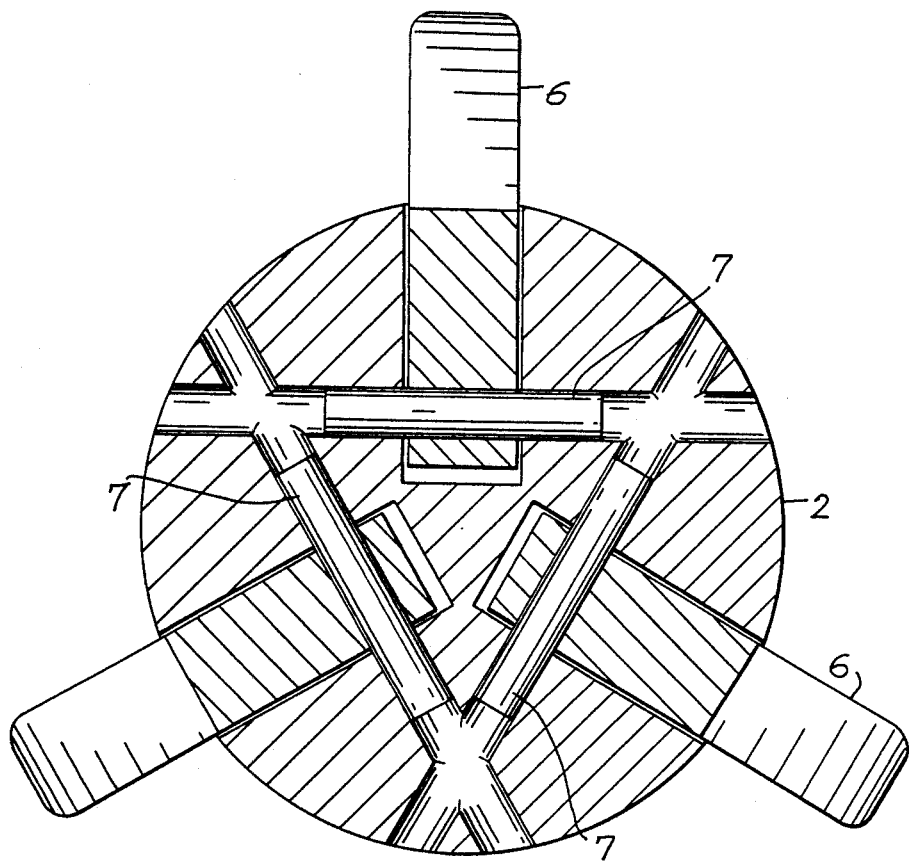
FIG. 2 is a cross-sectional view of the tool body taken at section 2-2 of FIG. 1 and showing the pivotal attachment of the cutting blades each in a groove in the tool body.

A preferred embodiment of the remotely operated cutting tool device according to the present invention is illustrated by FIG. 1, which shows tool assembly 1 comprising a main body 2 which includes a forward guide portion 3 having a reduced diameter, which portion can be inserted into the open end of an existing tube 4. The tool body 2 is provided with at least one longitudinal groove 5 located in the central portion of body 2. Each groove 5 contains a pivotable cutting blade 6, which is pivotably mounted to the rear portion of the tool body 2 by a pin 7, as is also shown more clearly by the FIG. 2 sectional drawing. A spring 8 is provided between the inner surface 6a of blade 6 and the bottom of groove 5 in the main body 2 of the tool, so that the pivotable blade 6 is forced outwardly by the spring 8, which is preferably a helical type compression spring. Preferably, three equally-spaced grooves 5 and pivotable blades 6 are provided in the tool body 2, as best shown by FIG. 2, each blade having an inner cutting surface 6b provided at the blade forward end.

Figure 3:
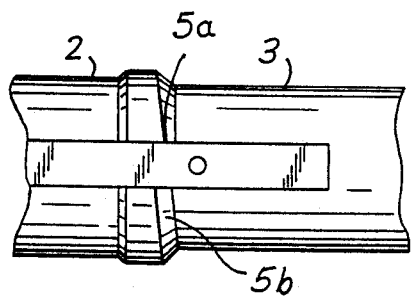
FIG. 3 is a partial longitudinal view of the rotary cutting tool body showing one side of a groove relieved so as to provide a cutting edge for machining the tube end.

FIG. 3 shows the tool body portion 2 adjacent front portion 3 being relieved on one side 5a of each longitudinal groove 5, thereby providing a sharp angle cutting surface 5b in the body 2 on the opposite side of groove 5.

Figure 4:
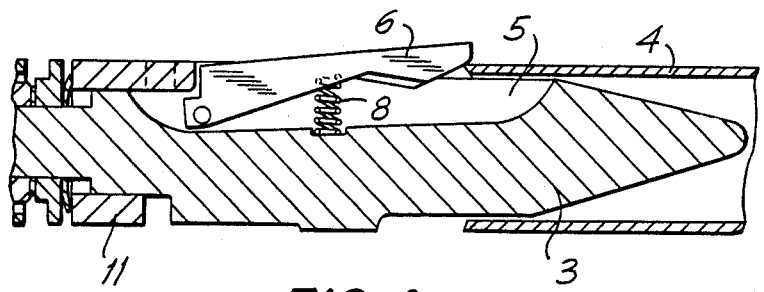
FIG. 4 shows a partial longitudinal cross-sectional view of the tool front end portion with a pivotal cutting blade partially extended to the blade contact the tube edge prior to being pushed forward onto the outside surface of the tube.

The rear portion 2a of the tool body 2 has a reduced diameter and is also threaded at 9 into an elongated shaft 10. The pivotable blades 6 are also each biased radially inwardly against spring 8 by an axially movable cylindrical collar 11, which is slidable on the rear portion 2a of the tool body 2. The collar 11 is in contact with the rearward end of each cutting blade 6 and is biased in a forward direction by at least one annular-shaped bevel or disc spring 12. The axial force provided by spring(s) 12 is determined by the axial location of thrust washer 13, which is controlled by selectively fitting shims 14 between shaft 10 and the thrust washer 13. The shims 14 also determine the position of the partially deployed cutting blades 6, as also shown in FIG. 4.

During use of the rotary cutting tool, as the forward end of tool 1 is pushed into engagement with the exposed end 4a of tube 1, the cutting blades 6 are forced radially outward, thereby compressing disc spring 12 which provides the force on cutting blade edges 6b necessary for machining the tube outside surface 4b, as shown by FIG. 1. Also, a spring (not shown) pushes the entire tool forward, thereby providing the axial force necessary for machining tube end 4a. Machining of the tube end 4a and outside surface 4b is accomplished by rotating shaft 10 within an elongated sleeve 17 with a suitable motor driver means (not shown) attached to the shaft at end 10a. Shaft 10 is located by and rotates within front sleeve bearing 15 and rear ball bearing 16. Sleeve bearing 15 is press fitted into the front end of the actuator push rod sleeve 17. Ball bearing 16 is held to shaft 10 by a retaining ring 18 and into end cap 19 with retaining ring 20.

The rear end of the tool 1 contains an actuating mechanism for controlling the position of the pivotable cutting blades 6. The mechanism surrounds a rear portion of rotatable shaft 10 and sleeve 17, and consists of an actuator housing 21 having rear end cap 19 and annular-shaped piston 22 located therein. Piston 22 is permanently attached to actuator push rod sleeve 17 by spiral pins 23. Also, "0" ring seals 24a and 24b provide outer pressure seals between the housing 21 and both the end cap 19 and the piston 22, respectively. The inner seal between the piston 22 and end cap 19 is provided by "0" ring 25. The end cap 19 is held in the actuator housing 21 by retaining ring 26.

Retraction of the cutting blades 6 as necessary for insertion of the tool 1 through the tube sheet hole is accomplished by introducing fluid pressure at port 27. This pressure will force piston 22 and actuator push rod sleeve 17 forward against compression spring 28 until rod sleeve 17 contacts thrust washer 13, which in turn will push disc spring 12 against cylindrical collar 11 and push the collar 11 against cutting blade 6, thereby forcing cutting blade 6 to pivot inwardly into the slots 5 in tool body 2. Once the forward end 3 of the tool 1 passes through the tube sheet opening, the fluid pressure at port 27 is released and compression spring 28 returns piston 22 to its original position, thereby leaving the cutting blades 6 in the partially deployed position shown in FIG. 4. The tool 1 is now pushed forward until its forward guide portion 3 enters the tube 4, and then the body cutter face 5a bottoms on tube end 4a. Shaft end 10a is now motor driven to rotate the tool body and blades so as to machine both the outside surface 4b and tube end 4a of existing tube 4.

When the tube machining step is completed, the tool 1 is withdrawn from tube 4, port 27 is pressurized to retract the pivotable cutting blades 6 into grooves 5 against springs 8, and the tool 1 is withdrawn through the tube sheet hole. A replacement tube (not shown) can then be inserted through the opening in the tube sheet and fitted in place for reliable remote internal welding onto end 4a of the existing tube 4.

This invention will be better understood with reference to the following example of operations for remotely trimming the exposed ends of tubes in a heat exchanger, which example should not be construed as limiting in scope.

EXAMPLE

In a heat exchanger for a nuclear steam power plant, deteriorated tube end portions are first removed from adjacent the lower tube sheet by using a special remotely operated cutting device (not shown). Then the exposed end portions of the heat exchanger tubes are remotely machined by using the rotary cutting tool in accordance with the present invention. The cutting tool has three equally-spaced pivoted cutting blades, which are first retracted by pressuzing the piston assembly, and the tool foward end is passed through an opening in the tube sheet. After being passed through the tube sheet opening, the blades are pivoted radially outwardly by depressurizing the piston assembly. The forward end of the cutting tool is inserted into the existing tube end, so that the cutting blades contact the end and outside surface of the tube. The cutting tool body is then rotated and the end of the tube is trimmed by the cutting blades and machined by the groove cutting edges at an angle of about 45° to the tube axis, suitable for welding a replacement tube to the existing tube. The cutting tool is then withdrawn from the tube, the cutting blades retracted by pressurizing the piston, and the tool removed from the heat exchanger.

Typical significant dimensions for the rotary cutting tool device and the tube being remotely machined are as follows:

Tool body diameter, in.
Front portion, 0.753
Central portion, 0.880
Groove width, in., 0.159
Blade width, in., 0.156
Tube outside diameter, in., 0.875
Tube inside diameter, in., 0.775

Although this invention has been defined broadly and in terms of a preferred embodiment, it is understood that variations and modification can be made thereto within the scope of the invention which is defined by the following claims.

I claim:

1. A rotary cutting tool useful for remotely machining tube ends, comprising:
   (a) an elongated main body having a central portion, a reduced diameter front end portion, and a reduced diameter rear portion, said body having at least one longitudinal groove formed therein;
   (b) a cutting blade provided within each said groove, said blade being pivotally attached at its rearward end to the central portion of said main body, said blade having an inner radial cutting surface provided at the blade forward end and adapted for machining the outside surface of a tube;
   (c) a cylindrical collar located around the rear portion of said main body and being slidable relative to the body, said collar being in contact with the rearward end of each said cutting blade;
   (d) first spring means located in each said groove between the groove bottom and said cutting blade therein, said first spring means adapted for forcing said pivotable cutting blade outwardly from said body;
   (e) an elongated shaft means connected to the rear portion of said body;
   (f) second spring means encircling said body rear portion and located between said cylindrical collar and said shaft, said second spring means being adapted for limiting the outward pivotal movement of said cutting blade; and
   (g) actuating means attached to said main body rear portion by an elongated sleeve surrounding said elongated shaft means for providing axial movement fo said cylindrical collar through said second spring means, whereby said tool body front end portion can be remotely inserted into a tube end and each cutting blade pivotably adjusted to contact the outerside of the tube end, after which the cutting tool is rotated to remotely machine the tube end to a desired shape.

2. A rotary cutting tool according to claim 1, wherein said main body is of cylindrical shape and has three circumferentially equally-spaced longitudinal grooves provided in the body, with a cutting blade being provided in each groove and pivotably attached to said tool body, so that said grooves and blades are equally-spaced from each other about the circumference of the tool main body, said blade additionally having an inner cutting surface located at the blade front end.

3. A rotary cutting tool according to claim 1, wherein said first spring means is a compression spring which biases each pivotable cutting blade outwardly from said body central portion.

4. A rotary cutting tool according to claim 1, wherein said second spring means is an annular-shaped bevel disc spring provided encircling said rear portion of the tool body between the cyclindrical collar and the shaft and surrounding sleeve.

5. A rotary cutting tool according to claim 1, wherein a cutting edge is provided in the body central portion on one side of each said longitudinal groove opposite a relieved side of the groove.

6. A rotary cutting tool according to claim 1, wherein said actuating means includes a fluid piston operated unit provided around a rear portion of said elongated sleeve and shaft means.

7. A rotary cutting tool according to claim 6, wherein said elongated sleeve provided around said elongated shaft means contacts said cylindrical collar and is axially movable by a spring-loaded pressurizable piston.

8. A rotary cutting tool according to claim 6, wherein a thrust washer is provided between said cylindrical collar and said elongated sleeve.

9. A rotary cutting tool according to claim 6, wherein said shaft is rotatably supported at its forward end within said sleeve by a bearing and is rotatable supported at its rear end within a housing of said piston unit by an end cap and bearing retained in said housing.

10. A rotary cutting tool according to claim 6, wherein said piston unit is annular-shaped and is rigidly attached to said elongated sleeve.

11. An elongated rotary cutting tool device useful for remotely machining tube ends, said tool comprising:
   (a) an elongated cylindrical-shaped main body having a central portion, a reduced diameter front end portion and a reduced diameter rear portion, said main body having three narrow circumferentially equally-spaced longitudinal grooves formed therein;
   (b) a cutting blade provided within each said groove, said blade being pivotally attached at its rearward end to the central portion of said main body and having an inner radial cutting surface provided at the blade forward end and adapted for machining the outside surface of a tube;
   (c) a cyindrical collar slidable located around said body rear portion, said collar being in contact with the rearward end of each cutting blade;
   (d) first compression spring means located in each said groove between the groove bottom and the cutting blade therein, said first spring means being adapted for forcing said pivotable cutting blade
   (f) second spring means encircling said body rear portion and located between said cylindrical collar and said shaft means, said second spring means being adapted for limiting the outward pivotal movement of each said cutting blade; and
   (g) actuating means attached to said main body rear portion by an elongated sleeve surrounding said elongated shaft means for providing axial movement for said cylindrical collar through said second spring means, whereby said tool body front end portion can be remotely inserted into a tube end and each cutting blade pivotably adjusted to contact the outer side of the tube end, after which the cutting tool is rotated to remotely machine the tube end to a desired shape.

12. A method for remotely machining an end portion of a tube, comprising the steps of:
   (a) providing a rotary cutting tool having a reduced diameter front end body portion and at least one retracted pivotable cutting blade provided in a longitudinal groove, and inserting said tool front end portion into a tube to be machined;
   (b) adjusting the position of the tool pivotable cutting blade surface so that the cutting surfaces provided at the blade front end contact the tube outer surface; and
   (c) rotating said tool body and extended cutting blade and thereby remotely machining the tube outer surface to provide a desired shape on the tube end.

13. A tube remote machining method according to claim 12, wherein the tube end is also machined by a cutting edge provided on the longitudinal groove in the tool body for containing the cutting blades.

14. A tube remote machining method according to claim 12, wherein: the tool cutting blade is pivotably adjusted inwardly against spring means by pressurizing a piston unit to axially move the piston and a cylindrical collar relative to the tool body so as to contact the rear end of each pivotable cutting blade.

15. A tube remote machining method according to claim 12, wherein the pivotable blade is retracted by pressurizing a piston in an actuator means, after which the cutting tool is withdrawn from the tube.

16. A method for remotely machining an end portion of a tube, comprising the steps of:
   (a) providing a rotary cutting tool having a reduced diameter front end portion of an elongated main body and pivotable cutting blades each provided in a longitudinal groove in said main body, pressurizing an actuating means in the cutting tool to retract the cutting blades, then inserting the rotary cutting tool front end portion into a tube to be machined;
   (b) adjusting pressure on the actuating means of the tool to extend the cutting blades so that they contact the tube outer surface;
   (c) moving the cutting tool forward so that a cutting surface of the longitudinal groove contacts the tube end;
   (d) rotating the tool body to scrape the tube outer surface and machine a bevelled surface on the tube end;
   (e) partially withdrawing the tool and repressurizing said tool actuating means and fully retracting the cutting blades into the tool body; and
   (f) withdrawing the cutting tool from the tube.

* * * * *